United States Patent [19]

Lee

[11] E Re. 30,166

[45] Reissued Dec. 11, 1979

[54] HETERODYNE READOUT HOLOGRAPHIC MEMORY

[75] Inventor: Tzuo-Chang Lee, Bloomington, Minn.

[73] Assignee: Honeywell Inc., Minneapolis, Minn.

[21] Appl. No.: 513,447

[22] Filed: Oct. 9, 1974

Related U.S. Patent Documents

Reissue of:

[64] Patent No.: 3,698,010
Issued: Oct. 10, 1972
Appl. No.: 181,803
Filed: Sep. 20, 1971

[51] Int. Cl.[2] ..... G11C 11/02; G03H 1/30; G03H 1/22

[52] U.S. Cl. ..... 365/122; 250/550; 250/199; 350/3.62; 350/3.78; 350/3.86; 365/125; 365/216

[58] Field of Search ..... 350/3.5, 3.62, 3.78, 350/3.85, 3.86; 356/106, 109; 340/173 LT, 173 LM, 174 YC; 250/199, 550; 365/122, 125, 216

[56] References Cited

U.S. PATENT DOCUMENTS

| | | | |
|---|---|---|---|
| 3,300,653 | 1/1967 | Boyd et al. | 331/94.5 N |
| 3,363,104 | 1/1968 | Waite et al. | 250/199 |
| 3,371,265 | 2/1968 | Woodbury et al. | 331/94.5 N |
| 3,444,316 | 5/1969 | Gerritsen | 350/3.5 |
| 3,530,442 | 9/1970 | Collier et al. | 350/3.5 |
| 3,544,795 | 12/1970 | Korpel | 250/199 |
| 3,587,301 | 6/1971 | Chau | 350/3.5 |
| 3,604,807 | 9/1971 | Champagne | 350/3.5 |
| 3,622,794 | 11/1971 | Pond et al. | 350/3.5 |
| 3,623,024 | 11/1971 | Hamilton | 340/173 LM |
| 3,628,847 | 12/1971 | Bostwick | 350/3.5 |
| 3,653,067 | 3/1972 | Anderson et al. | 350/3.5 |
| 3,695,744 | 10/1972 | Clay | 350/3.5 |
| 3,779,631 | 12/1973 | Shupe | 350/3.5 |

*Primary Examiner*—Ronald J. Stern
*Attorney, Agent, or Firm*—Omund R. Dahle; Henry L. Hanson

[57] ABSTRACT

A holographic optical memory utilizes an optical heterodyne technique to significantly increase the signal-to-noise ratio during the readout stage of operation. A light source provides a coherent light beam which is split into a readout beam and a local oscillator beam. The readout beam is directed to one of the holograms stored in the memory medium and a portion of the readout beam is diffracted by the hologram to form a reconstructed image of the bit pattern stored in the hologram at the reconstructed image plane. The local oscillator beam is superimposed with the diffracted portion of the readout beam. An optical frequency translator is positioned in either the readout beam or the local oscillator beam to cause the beams to have different optical frequencies. Therefore, when the two beams are superimposed, a beat frequency signal is produced. An array of detectors is positioned at the reconstructed image plane to receive the superimposed beams. Each detector of the array is positioned to receive the light representing one bit of the bit pattern and to provide an output signal indicative of the intensity of the beat frequency signal received.

27 Claims, 5 Drawing Figures

HETERODYNE READOUT HOLOGRAPHIC MEMORY

Matter enclosed in heavy brackets [ ] appears in the original patent but forms no part of this reissue specification; matter printed in italics indicates the additions made by reissue.

BACKGROUND OF THE INVENTION

This invention relates to an optical memory and in particular to a holographic optical memory.

In the specification, the term "light" is used to mean electromagnetic waves within the band frequencies including infrared, visible and ultraviolet light.

A holographic optical memory makes use of a memory medium upon which many individual holograms are stored. Each hologram represents a different bit pattern or "page". The information is stored by directing two beams to a desired location on the memory medium. One beam, the information beam, contains the bit pattern formed by a page composer, while the second beam acts as the reference beam necessary for holographic storage. To read out the information, a readout beam selectively illuminates one of the holograms stored, thereby producing at a reconstructed image plane a reconstructed image of the bit pattern stored in the hologram. An array of photodetectors is located at the reconstructed image plane to detect the individual bits of the bit pattern.

This type of memory is extremely attractive. In the "bit-by-bit" type of optical memory, a single recorded spot on the memory medium represents only one information bit. On the other hand, a single hologram recorded on the same memory medium represents a page which may contain as many as $10^5$ bits. Memories having $10^5$ or $10^6$ pages have been proposed, with each page containing about $10^5$ bits.

Another advantage of the holographic optical memory is that the information stored in the hologram is stored uniformly throughout the hologram rather than in discrete areas. Therefore the hologram is relatively insensitive to blemishes or dust on the memory medium. A small blemish or dust particle on the memory medium cannot obscure a bit of digital data as it can if the bits are stored in a bit-by-bit memory.

One difficulty experienced with certain materials used for memory mediums in holographic optical memories, such as MnBi and certain photochromic materials, is that these materials exhibit a low diffraction efficiency. Therefore the signal received by the photodetector array is rather low. As a result the signal-to-noise ratio during the readout stage is also low. Although the intensity of the light received by the photodetector array can be increased to some extent by increasing the power of the readout beam, the readout beam power must not be so great that the information is erased or the film destroyed.

SUMMARY OF THE INVENTION

The holographic optical memory of the present invention utilizes an optical heterodyne technique during readout which greatly improves the signal-to-noise ratio.

A plurality of holograms each containing a particular bit pattern are stored upon the memory medium of the holographic memory. To achieve readout of a particular pattern, light source means provides a coherent light beam which is split by beam splitter means into a first and a second beam. Light beam directing means direct the first beam to one of the holograms. A portion of the first beam is diffracted by the hologram to form, at a reconstructed image plane, a reconstructed image of the bit pattern stored in the hologram. Light beam superimposing means superimpose the second beam with the diffracted portion of the first beam. The wavefronts of the superimposed portion of the first beam and the second beam are well matched to make the heterodyne technique effective. Optical frequency translator means positioned in the path of either the first or the second beam causes the one beam to have a different frequency from that of the other beam. Therefore, a beat frequency signal is produced when the first and second beams are superimposed. An array of detectors is positioned at the reconstructed image plane. Each detector of the array is positioned to receive light representing one bit of the bit pattern and provide an output signal indicative of the intensity of the beat frequency signal received.

DESCRIPTION OF THE PREFERRED EMBODIMENTS

Figure 1:
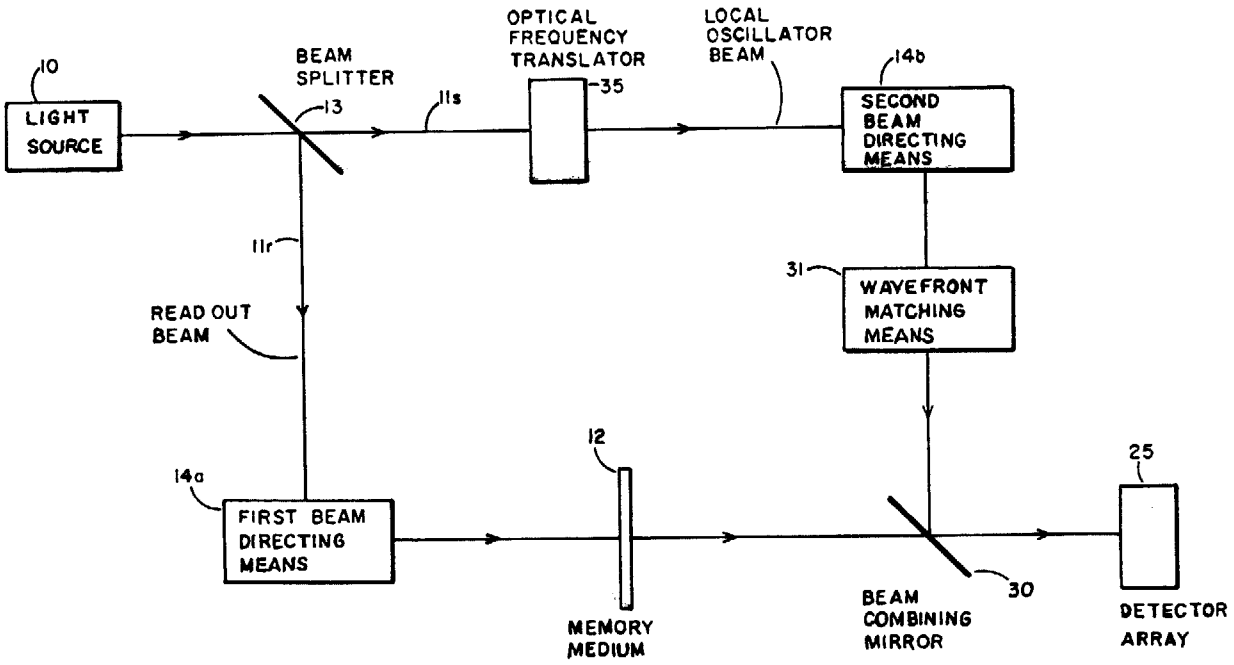
FIG. 1 diagrammatically shows one embodiment of the present invention.

FIG. 1 shows a readout system for a holographic memory utilizing the optical heterodyne technique of the present invention. Light source means 10 provides a coherent light beam 11. A plurality of holograms are stored in memory medium 12. Beam splitter 13 splits the light beam 11 into a first and a second beam. These beams are referred to as readout beam 11r and local oscillator beam 11s. First beam directing means 14a directs readout beam 11r to one of the holograms stored in memory medium 12. Readout Readout 11r impinges upon one of the holograms stored in memory medium 12 and a portion of readout beam 11r is diffracted by the hologram to form, at a reconstructed image plane, a reconstructed image of the bit pattern stored in the hologram. Light beam superimposing means, which consists of second beam directing means 14b, wavefront matching means 31 and beam combining mirror 30 superimpose local oscillator beam 11s with the diffracted portion of readout beam 11r. Alternatively, first and second beam directing means 14a and 14b may be replaced by a single beam directing means positioned between light source means 10 and beam splitter 13. In such an embodiment, beam inverting means must be positioned in the path of either readout beam 11r or local oscillator beam 11s. Optical frequency translator means 35 is positioned in the path of local oscillator beams 11s to provide local oscillator beam 11s with a frequency different from that of readout beam 11r. Therefore, when local oscillator beam 11s and the diffracted portion of readout beam 11r are superimposed, a beat frequency signal is produced. Detector array 25 is positioned at the reconstructed image plane. Each detector of the array is positioned to receive light representing one bit of the bit pattern and to provide an output signal indicative of the intensity of the beat frequency signal received.

It has been found that the particular embodiment of the present invention shown in FIG. 1 is quite difficult to implement in practice. This is due to the critical dependence on alignment of the local oscillator beam 11s and the diffracted portion of readout beam 11r. Not only must the two beams be parallel, but also the wavefronts must be well matched because small phase differences in the two beams with respect to each other will degrade the performance. For this reason, the preferred embodiment of the present invention further includes pivoting means positioned proximate the memory medium. The use of pivoting means in a holographic optical memory is described in a copending patent application Ser. No. 148,505, filed June 1, 1971, by T. C. Lee entitled "Holographic Optical Memory", which is assigned to the same assignee as the present invention. This system is particularly useful in optical heterodyne detection because it allows the holograms to be read using the same beams which acted as the reference beam and the signal beam during the storage of the holograms as the readout beam and local oscillator beam, respectively, during readout. The pivoting means not only pivots the portion of the readout beam which is diffracted by each hologram into a common reconstructed image plane, but also pivots the local oscillator beam into a reconstructed image plane. In so doing, wavefront matching is automatically achieved, making a separate wavefront matching means unnecessary.

Referring to FIG. 2, there is shown a holographic optical memory representing one preferred embodiment of the present invention. Elements similar to those described in FIG. 1 are denoted by identical numerals. Light source means 10 provides a coherent light beam 11. Memory medium 12 is provided for the storage of a plurality of holograms. In the particular embodiment shown in FIG. 2 the memory medium is a magnetic film of the manganese bismuth. However, it is to be understood that other materials may be used as memory medium 12. These include photochromic, photoplastic and various photographic materials. Beam splitter means 13 is positioned in the path of light beam 11 to split coherent light beam 11 into a first beam 11r and a second beam 11s. Beam directing means simultaneously direct first beam 11r and second beam 11s to coincide at a selected region of memory medium 12. In the particular embodiment shown in FIG. 2, beam directing means comprise light beam deflector means 14, an array of individual lenses 15, field lens 16, mirror 17, and beam inverting means 18. In one embodiment beam splitter 13, array 15 and field lens 16 comprise a single hololens, as described by W. C. Stewart and L. S. Cosentino in "Optics for a Read-Write Holographic Memory," Applied Optics, 9, 2271, Oct. 1970. Light beam deflector means 14 is positioned between light source means 10 and beam splitter means 13 for deflecting first and second beams 11r and 11s to a plurality of resolvable spots. Light beam deflector means 14 may for instance comprise acousto-optic, electro-optic or mechanical light beam deflectors. In its preferred form light beam deflector means 14 is capable of deflecting the first and second beams into two dimensions, hereafter referred to as the x and the y directions. In the various figures, two possible beam positions are shown which are represented by the solid and the dashed lines, respectively.

Mirror 17 may be positioned in either first beam 11r or second beam 11s. Mirror 17 changes the direction of propagation of one of the beams so that they may converge on a common area of memory medium 12.

The array of individual lenses 15 is positioned in the path of second beam 11s. The array may comprise a hololens or, as shown in FIG. 2, may consist of a panel of fly's eye lenses. Each lens is positioned at one of the plurality of resolvable spots. Preferably the size of each lens is equal to that of one resolvable spot. The function of the individual lenses is to reduce the beam diameter of the resolved spot such that the ratio of the original spot size to the reduced spot size is equal to or greater than the number of resolution elements needed to form one hologram. A Fourier transform hologram should have a minimum linear size of $3\lambda L,/d$ where d is the bit-to-bit spacing, $\lambda$ is the wavelength of the light and L is the distance between the object and the hologram. The resolution in the hologram is $\lambda L/D$ so that the hologram needs a minimum of $9N^2$ resolution spots, where D is the linear dimension of the object and N is the total number of bits in one dimension. If the diameter of the individual lens in the fly's eye lens panel is A and the focal length f, then the condition $(A^2/\lambda f)^2 \geqq 9N^2$ must be satisfied. A similar system for increasing the number of resolvable spots by the use of fly's eye lenses is described in co-pending patent application, Ser. No. 841,057, by T. C. Lee and J. D. Zook, now U.S. Pat. No. 3,624,817, which is assigned to the same assignee as the present invention.

Field lens 16 pivots the deflected beam at pivot plane A. In the preferred embodiment shown in FIG. 2a, field lens 16 is in physical contact with the array of individual lenses 15. However, it is to be understood that field lens 16 may be separate from the array of individual lenses 15.

Figures 2A, 2B:
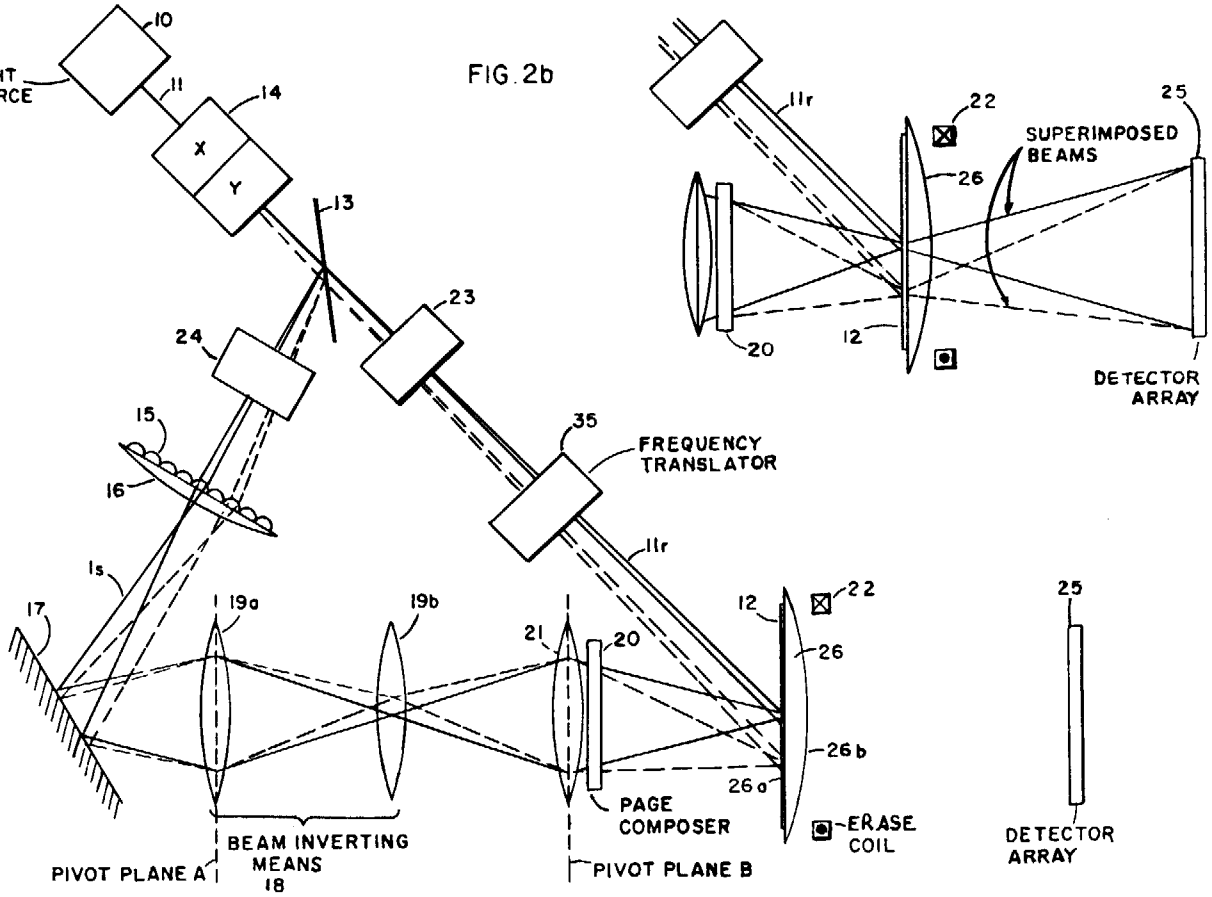
FIGS. 2a and b show a preferred embodiment of the present invention in which pivoting means are utilized to pivot the readout and local oscillator beams into a common reconstructed image plane.

Beam inverting means 18, which comprises lenses 19a and 19b positioned in the path of second beam 11s, inverts the angular direction $+\phi$ into $-\phi$, where $\phi$ is the angle which the central ray of second beam 11s make with respect to the optical axis of the lens system. Beam inverting means 18 is necessary to ensure that the deflected first and second beams 11r and 11s always coincide at the memory medium. Beam inverting means 18 alternatively may be positioned in the path of reference beam 11r, and may comprise a pair of dove prisms rather than lenses 19a and 19b. As shown in FIG. 2a, beam inverting means 18 is so positioned that second beam 11s is again pivoted at pivot plane B.

Page composer 20 is positioned in the path of second beam 11s proximate pivot plane B. Page composer 20 creates a bit pattern during the writing stage of operation. Fourier transform lens means 21 performs a Fourier transform of the bit pattern. Page composer 20 may be positioned such that second beam 11s passes through page composer 20 prior to or after second beam 11s passes through Fourier transform lens means 21.

Beam intensity control means, which in the embodiment shown in FIG. 2a comprise individual modulators 23 and 24 in the first and second beams, cause the combined intensity of the first and second beams to be sufficient to store the bit pattern as a hologram during the writing stage. During the reading stage the intensity of light incident upon the hologram must be insufficient to alter the hologram. Although two modulators 23 and 24 are specifically shown in the Figures, it is to be understood that in some embodiments of the present invention, a single modulator which is positioned between light source 10 and beam splitter 13 may comprise the beam intensity control means.

When memory medium 12 comprises a magnetic film, erase coil 22 positioned proximate memory medium 12 may be utilized to aid erasure of the holograms.

FIG. 2b shows the operation of the system of FIG. 2a during the reading stage of operation. During readout both first beam 11r and second beam 11s are directed to one of the holograms stored on memory medium 12. Therefore, during readout first beam 11r acts as the readout beam while second beam 11s acts as the local oscillator beam. Modulators 23 and 24 control the intensity of beams 11r and 11s such that the combined intensity is insufficient to alter the hologram during readout. Optical frequency translator means 35 positioned in the path of first beam 11r causes first beam 11r to have a different optical frequency from that of second beam 11s. Alternatively, frequency translator means 35 may be positioned in the path of second beam 11s, as was shown in FIG. 1. During readout, all the light valves of page composer 20 are open.

Pivoting means in the form of pivoting lens 26 which may comprise a single lens or multiple lenses is positioned proximate memory medium 12. The undiffracted portion of second beam 11s and the diffracted portion of the first beam 11r are superimposed and their wavefronts are well-matched after passing the memory medium plane. Pivoting lens 26 pivots the superimposed beams from each of the plurality of holograms into a common reconstructed image plane. An array of detectors 25 is positioned at the reconstructed image plane. Each detector of the array is positioned to receive one bit of the bit pattern and to provide an output signal indicative of the intensity of the beat frequency signal produced by the superimposed first and second beams.

The pivoting lens 26 shown in FIG. 2 has a substantially flat surface 26a and a curved surface 26b. Memory medium 12 is a deposited layer on the substantially flat surface 26a of pivoting lens 26. However, it is to be understood that pivoting lens 26 may be separate physically from memory medium 12.

Figure 3A:
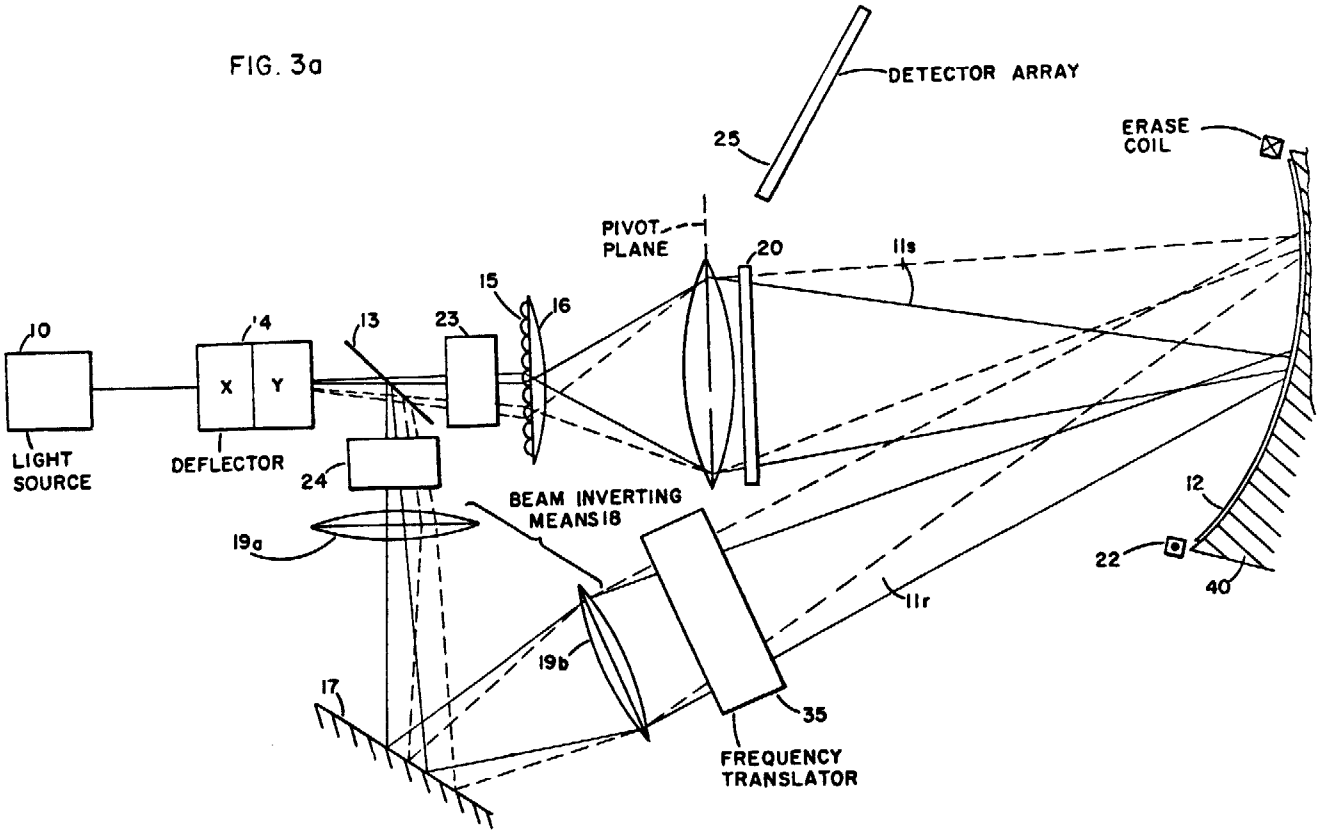
FIGS. 3a and b show another embodiment of the present invention in which a magnetic film is the memory medium and the Kerr effect readout from the magnetic film is utilized.
Figure 3B:
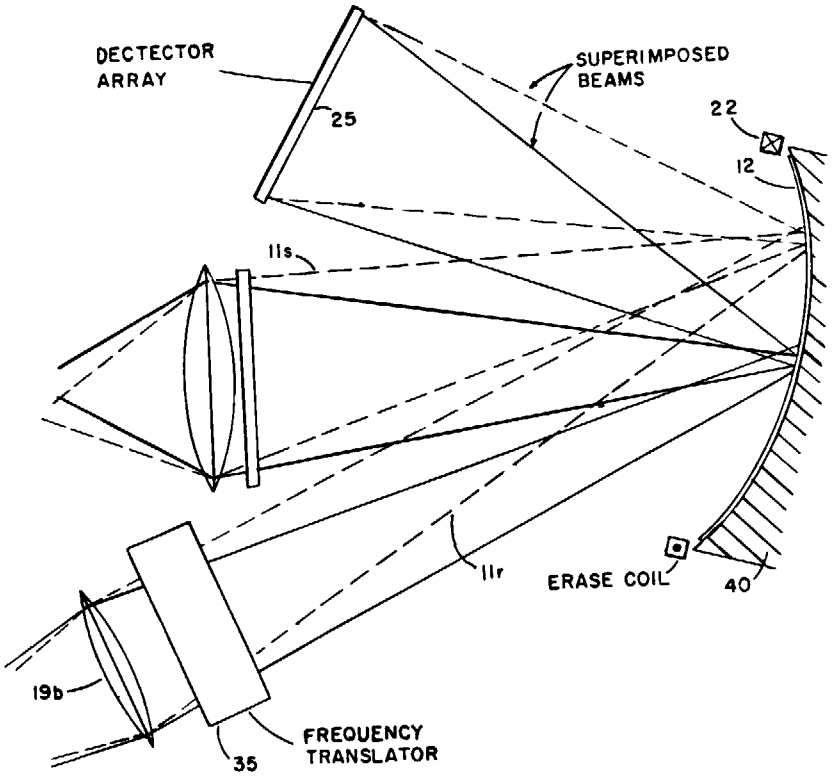

FIGS. 3a and 3b show another embodiment of the present invention in which a magnetic film is memory medium 12 and in which the magneto-optic Kerr effect readout from the magnetic film is utilized. In the Kerr effect the diffracted portion of the readout beam is reflected by the magnetic film whereas in a Faraday effect readout such as shown in FIG. 2b, the diffracted portion of the readout beam is transmitted through the magnetic film. The system of FIG. 3 is similar to that shown in FIG. 2 and similar numerals are used to designate similar elements. In the embodiment shown, the pivoting means comprises a parabolic mirror 40 rather than a lens such as pivoting lens 26 of FIG. 2. Memory medium 12 comprises a magnetic film such as MnBi which is deposited on the surface of parabolic mirror 40. It should be noted that beam inverting means 18 and mirror 17 are positioned in the path of first beam 11r, rather than in the path of second beam 11s as shown in FIG. 2.

During readout, FIG. 3b, both first beam 11r and second beam 11s are again directed to memory medium 12, as described previously with reference to FIG. 2b. Parabolic mirror 40 pivots the undiffracted portion of second beam 11s and the diffracted portion of first beam 11r. The superimposed beams are received by detector array 25 which is positioned at the common reconstructed image plane. It should be noted that in FIG. 3, page composer 20 and detector array 25 obey an object-image relationship with respect to parabolic mirror 40. It can be shown that when page composer 20 and detector array 25 are positioned symmetrically with respect to the principal axis of parabolic mirror 40, and when the magnification is unity, the astigmatism and distortion of these elements is automatically eliminated.

To demonstrate the significant improvement in performance of the present invention, a comparison will be made of the performance of the system shown in FIGS. 2 and 3 when a single readout beam is utilized and when the heterodyne detection of the present invention utilizing two beams is used.

In a readout system where "straight detection" with a single readout beam is used, the light intensity of each bit p in the reconstructed bit pattern is governed by the diffraction efficiency $\eta$ of the memory medium and the number of bits per page $N^2$. That is, $$p = p_o \cdot \eta / N \qquad \text{Equation 1}$$

Using $\eta$ of $5\times10^{-5}$ for MnBi, $N^2$ of $5\times10^4$, the $p/P_o$ is equal to $10^{-9}$.

Assuming that the noise is comprised of thermal noise due to the load and shot noise due to the detector, the signal-to-noise ratio S/N can be described by the relation $$S/N = \frac{\frac{1}{2} i_1^2 R_{eq}}{[2ei_1 R_{eq}\Delta f + 2ei_d R_{eq}\Delta f + 4kT\Delta f]}, \qquad \text{Equation 2}$$

$$= \frac{\eta_q p}{4(h\nu\Delta f)} \Big/ \left[1 + \frac{(i_d)}{i_1} + \frac{(2kT)}{ei_1 R_{eq}}\right], \qquad \text{Equation 3}$$

where $$i_1 = \eta_q p/(h\nu/_e), \qquad \text{Equation 4}$$

$i_d$=dark current,
$R_{eq}$=equivalent load resistance, and
$\eta_q$=quantum efficiency of the detector,
h=Planck's constant,
$\nu$=Optical frequency,
e=Electric change,
$\Delta f$=Detector bandwidth,
k=Boltzman's constant, and
T=Absolute temperature.

The value of S/N depends on the illumination level p, the dark noise of the detector $i_d$ and the load resistor which in turn is determined by the bandwidth required, $\Delta f$. To give an example, assume that PIN photodiodes are used, that the dark current is $10^{-9}$ amp per photodiode in an array, that $\eta_q$ is equal to 0.5 so that $i_1$ equals about 0.3 na per nw of p, and that $R_{eq}$=10 K ohms and $\Delta f$=1 MHz. The bandwidth $\Delta f$ depends upon whether the readout is parallel or partially parallel such as in word-organized readout. For a word-organized readout, a data rate of 10 MHz calls for a bandwidth of 1 MHz if 10 bits constitute one word. Using these numbers the noise becomes thermal-noise limited (the thermal-noise limit extends to $R_{eq}$ of about 1 megaohm so that the S/N expression is simplified to $$S/N = \frac{1}{8} \frac{i_1^2 R_{eq}}{kT\Delta f} \qquad \text{Equation 5}$$

For $i_1$ of 1 na, S/N is equal to 2.5. This calls for a reading optical power of 3 watts. If the reading power is increased to 10 watts, S/N is increased to 20.

Turning now to the heterodyne readout system of the present invention, it can be shown that the a.c. power in each bit $P_{a.c.}$ is given by, $$p_{a.c.} = 2\sqrt{P_{LO}e^{-\alpha t}P_s \cdot \eta F}\ /N^2 = \frac{2\sqrt{r}}{1+r}\ P_o\sqrt{\eta F e^{-\alpha t}}\ /N^2 \qquad \text{Equation 6}$$

where $P_{LO}$ is local oscillator power, $P_s$ is the reading beam power in the reference channel and r equals $P_s/P_{LO}$. Also $\alpha$ is the optical absorption constant and t is the thickness of the memory medium. $\eta_F$ is the Faraday diffraction efficiency. Comparing Equation 6 with Equation 1, the gain in the available power per bit is $$G_F = (p_{a.c.}/p) = \frac{2\sqrt{r}}{1+r}\ \frac{e^{-\alpha t/2}}{\sqrt{\eta F}} \qquad \text{Equation 7}$$

For example, in the Faraday effect readout system of FIG. 2 using MnBi, $$e^{-\alpha t/2} = 0.17\sqrt{\eta F} = (5\times10^{-5})^{\frac{1}{2}} = 7\times10^{-3},$$

and using r=1, one gets $G_F=24$.

If the Kerr effect system shown in FIG. 3 is used, then $$p_{a.c.} = \frac{2\sqrt{r}}{1+r}\ po-\sqrt{\eta_K R}\ /N^2 \qquad \text{Equation 8}$$

and the gain is, $$G_K = \frac{2\sqrt{r}}{1+r}\sqrt{R/\eta K}\ , \qquad \text{Equation 9}$$

where $\eta_K$ is the Kerr diffraction efficiency and R is the reflectivity of the memory medium. Again, using r=1, and R=0.3 and $\eta_K=2\times10^{-5}$, one gets $G_K=120$. Therefore, the Kerr system is superior to the Faraday system when heterodyne readout is employed.

Turning now to the determination of S/N in the heterodyne readout system, it can be shown that the noise sources in a heterodyne receiver includes shot noise due to the d.c. photocurrent $I_o$, the dark current $I_o'$, and thermal noise from the lossy elements in the photodetector and the equivalent input noise of the amplifier, all of which is lumped into an equivalent noise temperature $T_{eq}$. Thus, $$S/N = \tfrac{1}{2} i_1^2 R_{eq}/[2eI_0R_{eq}\Delta f + 2eI_0'R_{eq}\Delta F + 4kT_{eq}\Delta f] \qquad \text{Equation 10}$$

There are two special cases of interest which provide insight into the performance of the heterodyne readout system of the present invention; one is the thermal noise limited case and the other is the shot-noise limited case. In the thermal noise case Equation 10 becomes, $$S/N = \frac{1}{8}\ \frac{i_1^2 R_{eq}}{kT\Delta f} \qquad \text{Equation 11}$$

where $$i_1 = 2\eta_q\sqrt{P_{LO}e^{-\alpha t}P_{s\eta F}}/N^2(h\nu/e) \qquad \text{Equation 12a}$$

if the Faraday effect is used, or $$i_1 = 2\eta_q\sqrt{P_{LO}RP_{s\eta K}}/N^2(h\nu/e) \qquad \text{Equation 12b}$$

if the Kerr effect is used.

As an example, assuming $P_{LO}=P_s=P_o/2$, assuming $\Delta f=1$ MHz, $\eta_q=0.5$, $h\nu=2$ eV, $N^2=5\times10^5$, R=0.3 and $\eta_K=2\times10^{-5}$, then $i_1/P_o$ is $10^{-8}$ amp/w. Therefore, when $R_{eq}=10^4$ ohms, $$(S/N)\cdot 1P^2 = 30/(\text{watt})^2. \qquad \text{Equation 13}$$

If 1 watt is used for reading, S/N is 30.

In the shot-noise limited cases $$I_0 >> 2kT/eR_{eq}, \qquad \text{Equation 14}$$

where $I_0$ is related to the optical power by $$I_o = \eta_q P_{LO} R/N^2\ \frac{(h\nu)}{e} \qquad \text{Equation 15}$$

The S/N ratio becomes, $$S/N = \frac{1}{4}\ \frac{i_1^2 R_{eq}}{eI_oR_{eq}\Delta f} = \frac{\eta_q}{h\nu\Delta f}\ \frac{(\eta_K P_s)}{N^2} \qquad \text{Equation 16}$$

It can be seen that in the shot-noise limited case, S/N is linearly proportional to the optical power while the thermal noise limited case S/N is proportional to the square of the optical reading power.

Again using the numbers $R_{eq}=10$ KΩ and T=300° K, Equation 14 yields the value of $(2kT/eR_{eq})=5.2\times10^{-6}$ amp. This value of $I_0$ corresponds to $P_{LO}$ of 3 watts. The optical power has to be much greater than 3 watts in order to drive the photodiode to shot-noise limited performance. Assuming $P_{LO}=15$ W and $P_{sig}=1$ watt, S/N becomes 625.

The foregoing analysis shows that a heterodyne system, particularly one using the kerr readout provides a significant improvement in S/N over the straight detection method by about a factor of 30 in the examples given.

While this invention has been disclosed with particular reference to the preferred embodiments, it will be understood by those skilled in the art that changes in form and detail may be made without departing from the spirit and scope of the invention.

The embodiments of the invention in which an exclusive property or right is claimed are defined as follows:

1. In a holographic optical memory having a memory medium upon which a plurality of holograms are stored, a system for reading out a bit pattern stored in one of the holograms, comprising:

light source means for providing a coherent light beam, beam splitter means for splitting the coherent beam into a first and a second beam, light beam directing means for directing the first beam to one of the plurality of holograms, a portion of the first beam being diffracted by the hologram to form at a reconstructed image plane a reconstructed image of the bit pattern stored in the hologram, light beam superimposing means for superimposing the second beam with the diffracted portion of the first beam, optical frequency translator means positioned in the path of one of the first and second beams to cause the one beam to have a different frequency from that of the other beam during readout, such that a beat frequency signal is produced when the first and second beams are superimposed, and an array of detectors positioned at the reconstructed image plane, each detector positioned to receive light representing one bit of the bit pattern and to provide an output signal indicative of the intensity of the beat frequency signal received.

2. The invention as described in claim 1 wherein the memory medium is a magnetic film.

3. The invention as described in claim 2 wherein the magnetic film is manganese bismuth.

4. A holographic optical memory comprising:

light source means for providing a coherent light beam, beam splitter means for splitting the coherent light beam into a first and a second beam, a memory medium for the storage of a plurality of holograms, beam directing means for simultaneously directing the first and second beams to coincide at a selected region of the memory medium, page composer means positioned in the path of the second beam between the beam splitter means and the memory medium for creating a bit pattern in the second beam during the writing stage, optical frequency translator means positioned in the path of one of the first and second beams to cause the one beam to have a different frequency from that of the other beam, such that a beat frequency signal is produced when the first and second beams are superimposed, beam intensity control means for causing the combined intensity of the first and second beams to be sufficient to store the bit pattern as a hologram during the writing stage, and insufficient to alter the hologram during the reading stage, pivoting means positioned proximate the memory medium for pivoting, during the reading stage, superimposed beams comprising a diffracted portion of the first beam and an undiffracted portion of the second beam into a common reconstructed image plane, and an array of detectors positioned at the common reconstructed image plane, each detector positioned to receive the light representing one bit of a reconstructed bit pattern formed by the diffracted portion of the first beam and to provide an output signal indicative of the intensity of the beat frequency signal received.

5. The holographic optical memory of claim 4 wherein the beam directing means comprises:

light beam deflector means positioned between the light source means and the beam splitter means for deflecting the first and second beams to a plurality of resolvable spots, mirror means positioned in the path of one of the first and second beams for changing the direction of propagation of the beam, inverting means positioned in the path of one of the first and second beams for inverting the angular direction of the beam, an array of individual lenses positioned in the path of the second beam, each lens being positioned at one of the plurality of resolvable spots, for reducing the beam diameter of the resolvable spots, and field lens means positioned in the path of the second beam between the array of individual lenses and the page composer means for pivoting the second beam at a first pivot plane.

6. The holographic optical memory of claim 5 wherein beam inverting means comprises first and second lenses.

7. The holographic optical memory of claim 5 wherein the beam inverting means is positioned in the path of the second beam.

8. The holographic optical memory of claim 7 wherein the beam inverting means is positioned essentially at the first pivot plane and wherein the beam inverting means further pivots the second beam at a second pivot plane.

9. The holographic optical memory of claim 8 wherein the page composer means is positioned proximate the second pivot plane.

10. The holographic optical memory of claim 5 wherein the page composer means is positioned essentially at the first pivot plane.

11. The holographic optical memory of claim 4 and further comprising Fourier transform lens means positioned in the path of the second beam proximate the page composer means for performing a Fourier transform of the bit pattern produced by the page composer means.

12. The holographic optical memory of claim 4 and wherein the pivoting means comprises pivoting lens means.

13. The holographic optical memory of claim 12 wherein the pivoting lens means comprises a lens having a substantially flat surface and a curved surface.

14. The holographic optical memory of claim 13 wherein the memory medium comprises a deposited layer on the substantially flat surface.

15. The holographic optical memory of claim 4 wherein the memory medium is a magnetic film.

16. The holographic optical memory of claim 15 wherein the diffracted portion of the first beam and the undiffracted portion of the second beam are transmitted through the magnetic film.

17. The holographic optical memory of claim 15 wherein the diffracted portion of the first beam and the undiffracted portion of the second beam are reflected by the magnetic film.

18. The holographic optical memory of claim 15 wherein the magnetic film is manganese bismuth.

*19. A system for reading out a bit pattern stored in a hologram, the system comprising:*

*means for directing a first beam to the hologram, a portion of the first beam being diffracted by the hologram to form a reconstructed image of the bit pattern;*

*means for superimposing a second beam with the diffracted portion of the first beam, the second beam differing from the first beam such that a beat frequency is produced when the first and second beams are superimposed; and*

*means for detecting a beat frequency signal produced by the superimposed first and second beams for each bit of the bit pattern.*

*20. A system for reading out a bit pattern stored in a hologram formed by a reference beam and an information beam, the system comprising:*

*means for directing first and second beams having different frequencies onto the hologram, the first beam following the path of the reference beam, the second beam following the path of the information beam;*

*means for pivoting superimposed beams comprising a diffracted portion of the first beam and a portion of the second beam into a common reconstructed image plane; and*

*means for detecting a beat frequency signal produced by the superimposed first and second beams, the beat frequency signal representing a bit of the bit pattern.*

*21. A heterodyne system for reading out a bit pattern stored in a hologram formed by a reference beam and an information beam, the heterodyne system comprising:*

*light beam directing means for directing a readout beam to the hologram, a portion of the readout beam being diffracted by the hologram to form a reconstructed image;*

*light beam superimposing means for superimposing a local oscillator beam with the diffracted portion of the readout beam; and*

*detector means for detecting a beat frequency signal generated by the superimposed beams, the beat frequency signal representing a bit of the bit pattern.*

*22. The invention of claim 21 wherein the readout beam follows a reference beam path and the local oscillator beam follows an information beam path.*

*23. In a holographic optical memory having a memory medium upon which a plurality of holograms are stored, a system for reading out a bit pattern stored in one of the holograms, the system comprising:*

*light beam directing means for directing a first beam to one of the plurality holograms, a portion of the first beam being diffracted by the hologram to form, at a reconstructed image plane, a reconstructed image of the bit pattern stored in the hologram;*

*light beam superimposing means for superimposing a second beam with the diffracted portion of the first beam, the first and second beams having different frequencies; and*

*an array of detectors positioned at the reconstructed image plane, each detector positioned to receive light representing one bit of the bit pattern and to provide an output signal indicative of the intensity of a beat frequency signal produced by the superimposed beams.*

*24. The invention of claim 23 wherein the first beam follows a reference beam path and the second beam follows an information beam path.*

*25. An arrangement for reading out a hologram formed by the interference of a reference beam and an object beam comprising in combination:*

*means for directing two spatially-unmodulated beams onto the hologram, one following the path of the reference beam and the other following the path of the object beam, the two beams differing from one another such that a beat frequency is produced when the first and second beams are superimposed; and*

*means for detecting the beat frequency component of the image reconstructed by the two beams.*

*26. A method of reading out a hologram formed by the interference of a reference beam and an object beam, comprising the steps of:*

*directing two spatially unmodulated beams onto the hologram, one following the path of the reference beam and the other following the path of the object beam;*

*frequency translating one of the beams such that a beat frequency is produced when the two beams are superimposed; and*

*detecting at least the beat frequency component of the image reconstructed by the two beams.*

*27. An arrangement for reading out a hologram formed by the interference of a reference beam and an object beam comprising, in combination:*

*means for directing two spatially unmodulated beams onto the hologram, one following the path of the reference beam and the other following the path of the object beam;*

*means for frequency translating one of said beams such that a beat frequency is produced when the two beams are superimposed; and*

*means for detecting at least the beat frequency component of the image reconstructed by the two beams.*

* * * * *